United States Patent [19]

Graham et al.

[11] Patent Number: 4,534,460
[45] Date of Patent: Aug. 13, 1985

[54] CHAIN-DRIVEN POCKET ELEVATOR

[75] Inventors: James T. Graham, Rochester; Gerald E. Johnson, Flint, both of Mich.

[73] Assignee: Lamb Technicon Corp., Warren, Mich.

[21] Appl. No.: 457,970

[22] Filed: Jan. 14, 1983

[51] Int. Cl.³ .............................................. B65A 47/84
[52] U.S. Cl. ................................... 198/482; 198/801; 198/836
[58] Field of Search ............... 198/481, 482, 796, 801, 198/779, 836, 793, 607, 654, 563, 728, 735, 540, 459

[56] References Cited

U.S. PATENT DOCUMENTS

| | | | |
|---|---|---|---|
| 334,274 | 1/1886 | Norton | 198/441 |
| 1,941,153 | 12/1933 | Peyser . | |
| 2,687,796 | 8/1954 | Keesling . | |
| 2,756,862 | 7/1956 | Creed | 198/481 |
| 2,924,325 | 2/1960 | Kay et al. | 198/563 |
| 3,193,076 | 7/1965 | Creed | 198/476 X |
| 3,200,935 | 8/1965 | Whitfield | 198/801 |
| 3,294,217 | 12/1966 | Kay | 198/563 |
| 3,460,668 | 8/1969 | Gerrans | 198/779 |
| 3,715,024 | 2/1973 | Mumma | 198/779 X |
| 3,848,730 | 11/1974 | Niederer et al. | 198/779 |
| 4,225,034 | 9/1980 | Sarovich | 198/607 |

Primary Examiner—Joseph E. Valenza
Assistant Examiner—Jonathan D. Holmes
Attorney, Agent, or Firm—Barnes, Kisselle, Raisch, Choate, Whittemore & Hulbert

[57] ABSTRACT

A pocket conveyor, specifically a pocket elevator, in which a plurality of spools are cantilevered from an endless drive chain. The spools cooperate with each other and with stationary guide rails to form a series of pockets for conveying workpieces between feed and discharge stations. Various embodiments of the feed station include a starwheel rotating in synchronism with urging workpieces into recesses between the starwheel fingers. This guide surface has a clearance at the inlet and which cooperates with deformable construction of the starwheel fingers to prevent workpiece jam at the feed station. Another embodiment of the feed station includes a flat angulated surface for receiving workpieces by gravity and a flexible reach of chain extending at an angle toward the workpiece surface for automatically accommodating itself to workpiece availability without jamming. The discharge station includes a second starwheel with fingers which enter successive pockets and displace workpieces therefrom.

5 Claims, 15 Drawing Figures

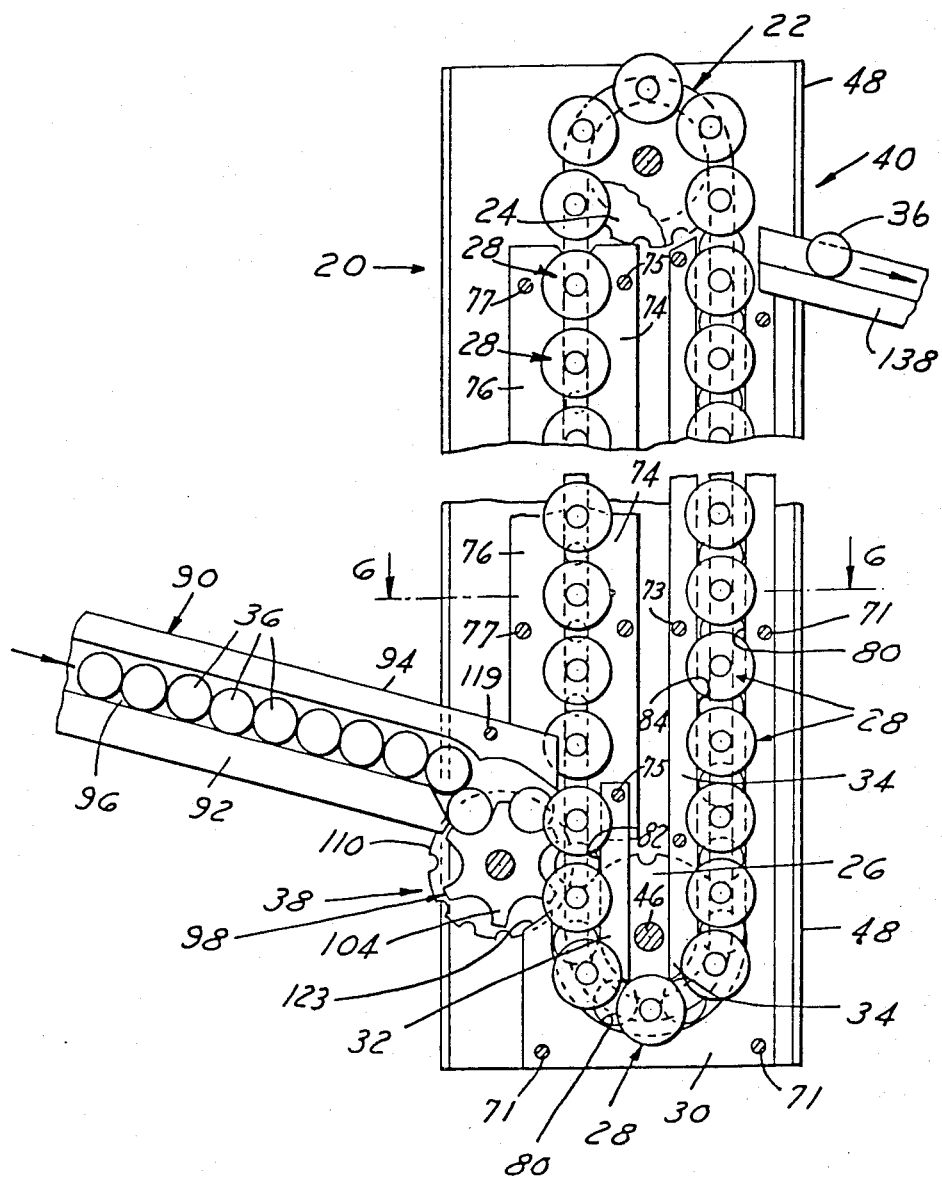

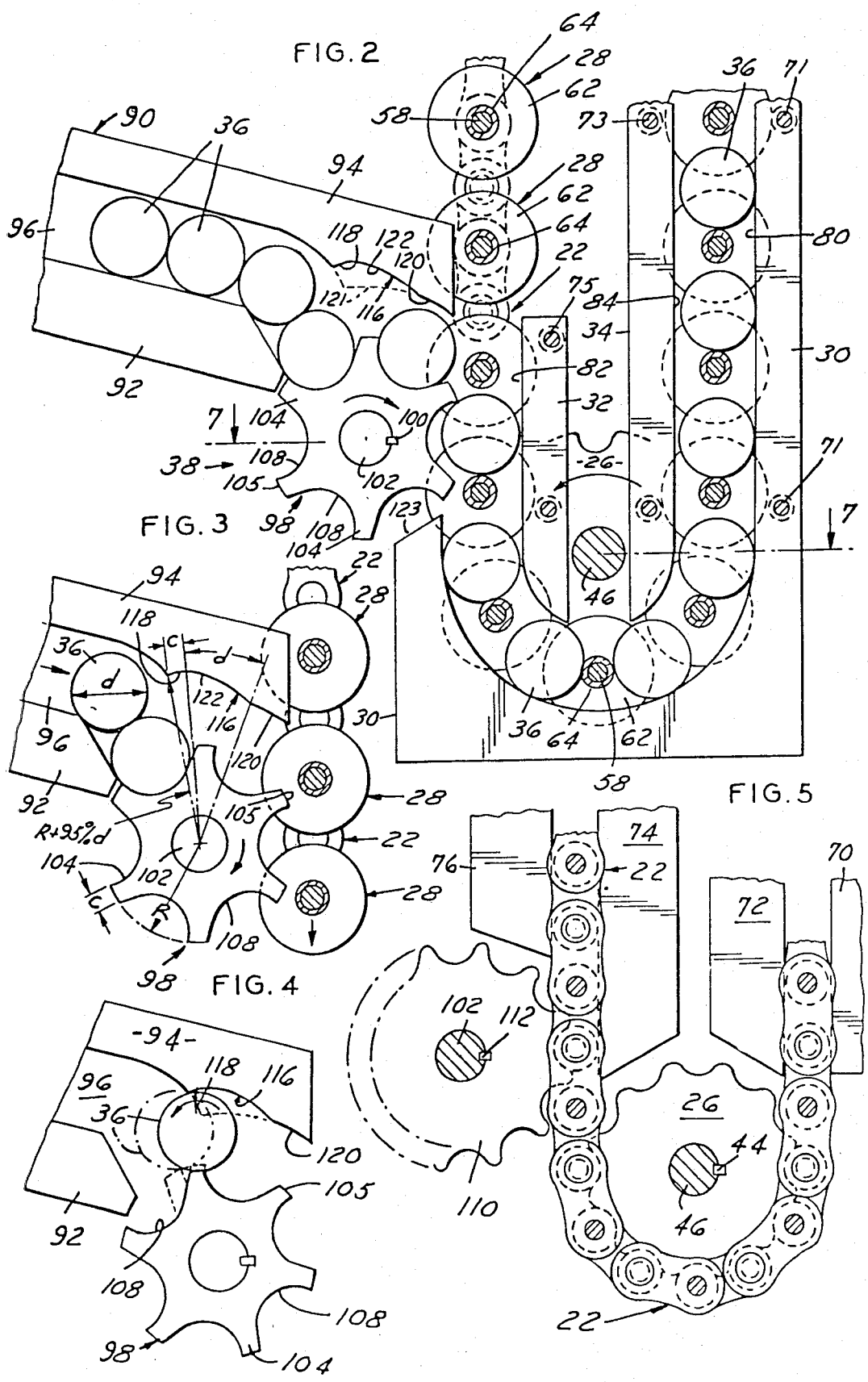

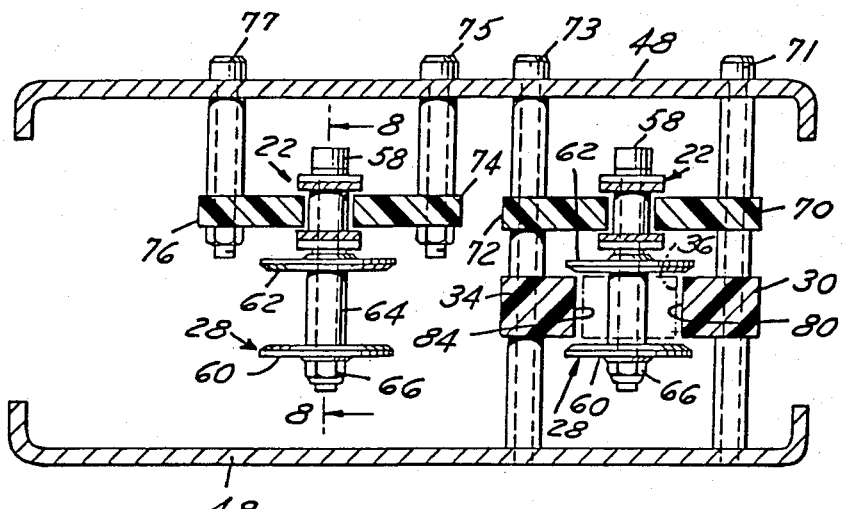
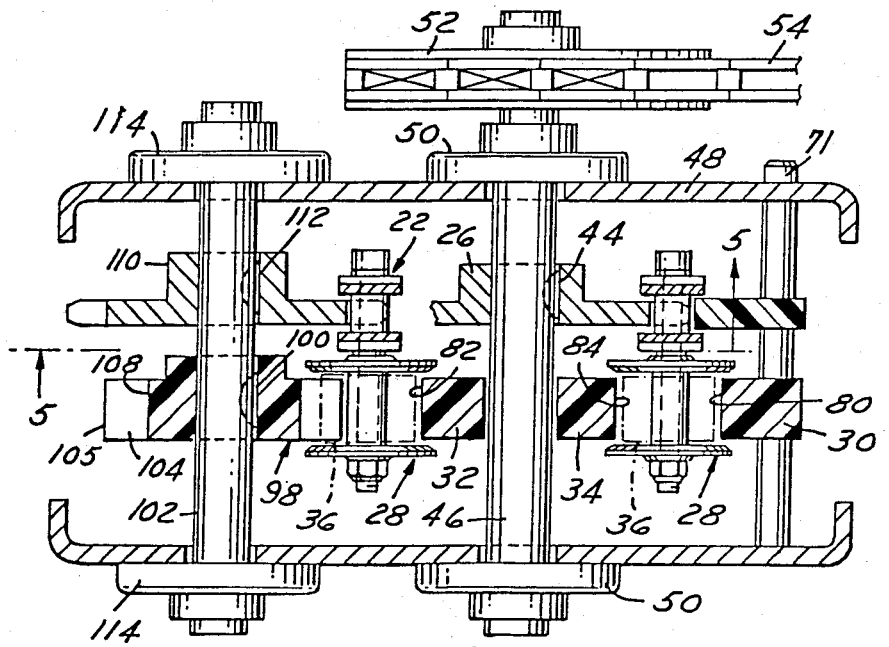
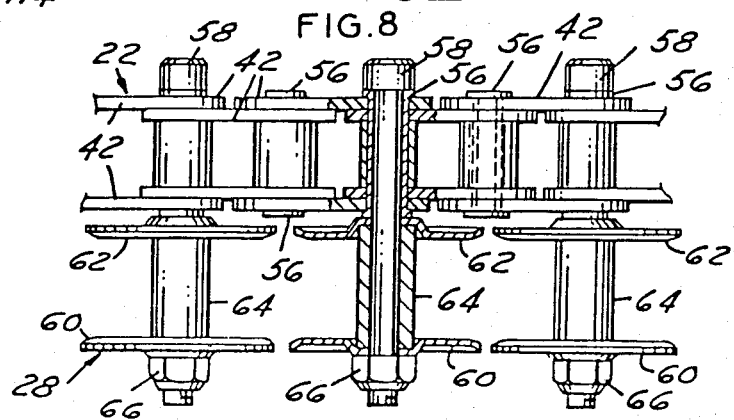

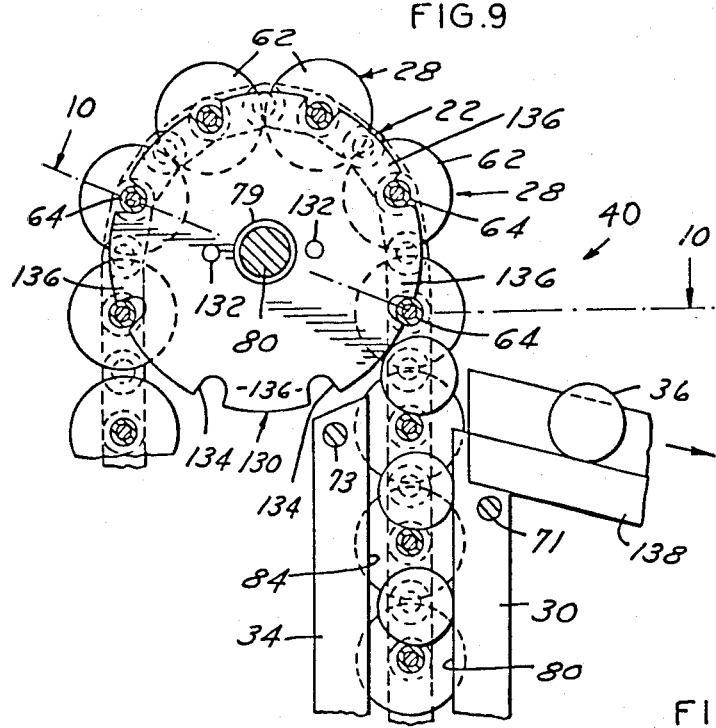
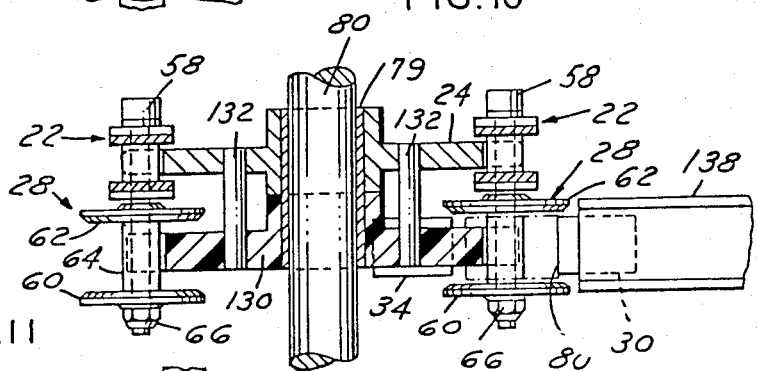
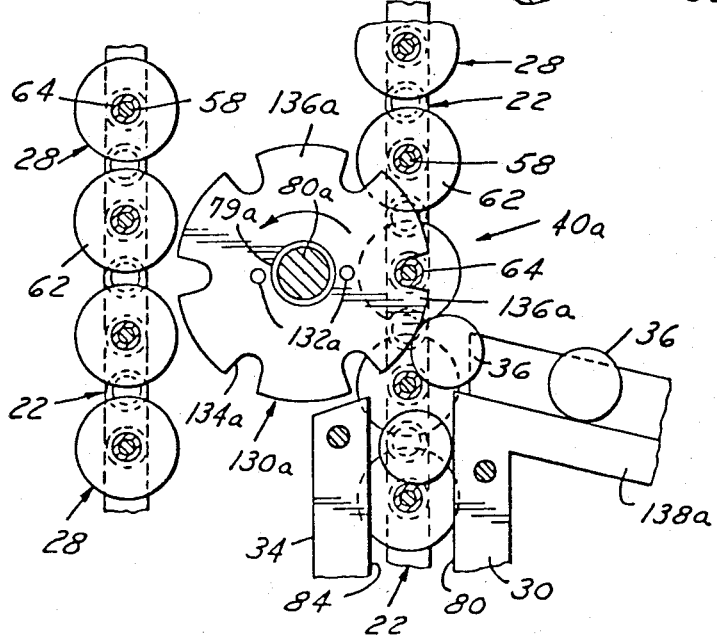

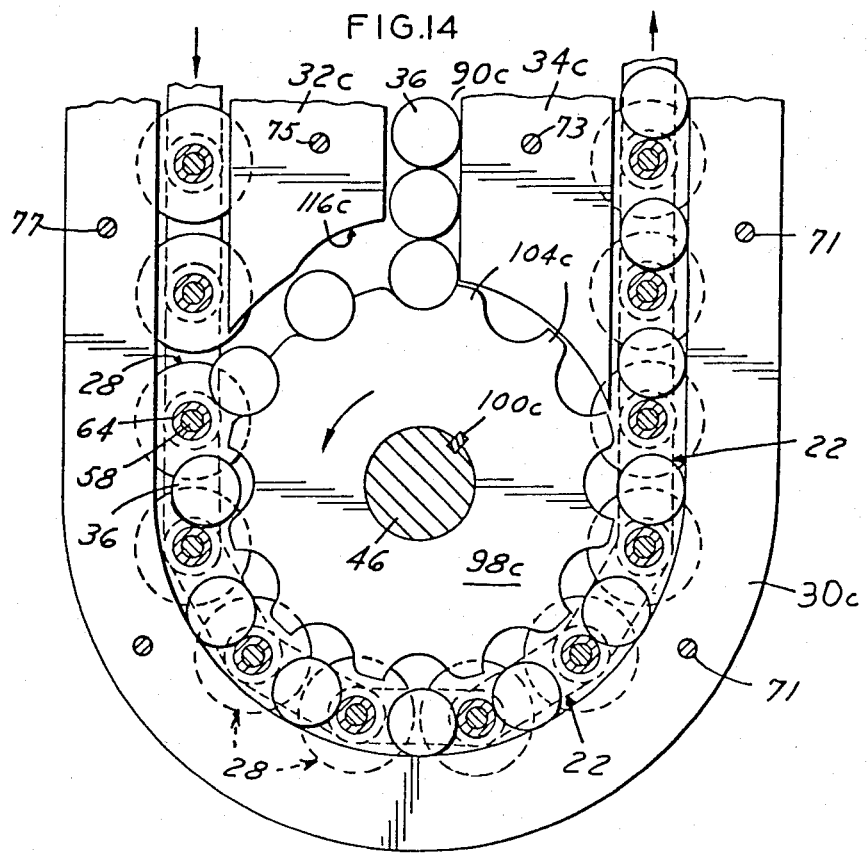
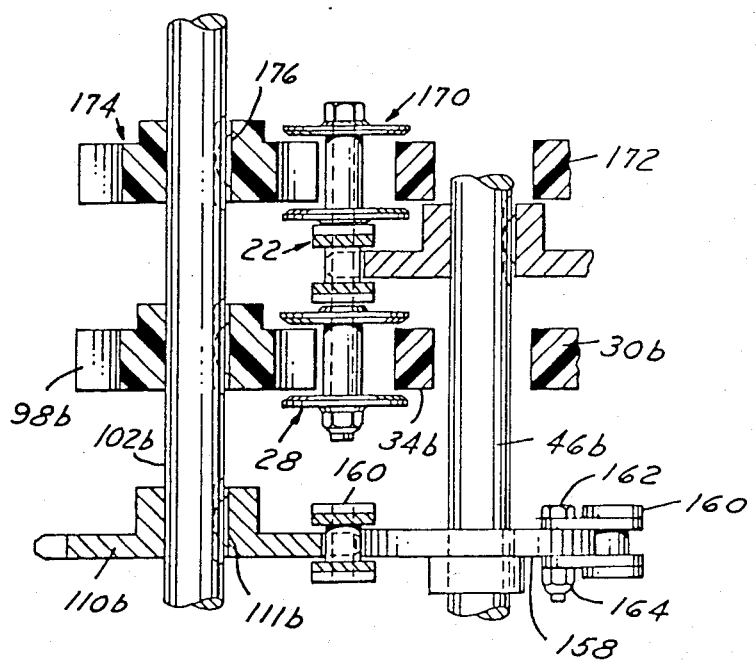

CHAIN-DRIVEN POCKET ELEVATOR

The present invention is directed to pocket conveyors, and more particularly to a chain-driven pocket elevator of the type which includes a starwheel or the like for loading individual workpieces into successive elevator pockets.

BACKGROUND OF THE INVENTION

A frequent problem encountered with pocket conveyors, specifically pocket elevators, in industrial and other applications is a tendency for workpieces to jam at the elevator feed station or mechanism. A feed jam, which typically occurs in situations where workpieces are directed at random intervals to the elevator inlet and out of synchronism with the feed mechanism, may cause substantial delays in operation of the conveyor and expense in repair or replacement of damaged conveyor components or workpieces. The problem of feed jam occurs in gravity-fed pocket elevators, but is particularly acute in the case of positive-feed conveyors or elevators which employ a starwheel or the like for synchronously placing individual workpieces into successive conveyor pockets.

OBJECTS AND SUMMARY OF THE INVENTION

A general object of the present invention therefore is to provide a chain-driven pocket conveyor having an improved feed mechanism or station which resists jamming of workpieces at the conveyor inlet.

A more specific object of the invention is to provide a chain-driven pocket elevator in which the arrangement of the feed mechanism is susceptible to a variety of modifications and/or reorientations to accommodate differing application requirements.

A further object of the invention is to provide a chain-driven pocket conveyor or elevator which embodies improved simplicity and economy.

Yet another object of the invention is to provide a chain-driven pocket conveyor having a high density of workpieces per unit of chain length.

Another object of the invention is to provide a pocket elevator of the type previously described which may be readily adjusted in the field to accommodate a variety of workpiece sizes.

In accordance with one important aspect of the present invention, a chain-driven pocket conveyor is provided with an improved feed station or mechanism for feeding workpieces of circular cross section synchronously into successive pockets of a continuously moving conveyor while resisting and substantially eliminating the tendency to jam in the event of randomly fed workpieces. The feed station in accordance with this aspect of the invention includes a starwheel comprising a plurality of fingers angularly separated by workpiece-receiving recesses and rotating in synchronism with the elevator drive chain. In one embodiment of the invention, a gravity chute directs workpieces to the periphery of the starwheel and has a contoured surface at its outlet end radially spaced from the periphery of the starwheel for guiding workpieces into successive starwheel recesses. The portion of the guide surface immediately adjacent to the gravity chute has a radial clearance or spacing from the finger periphery substantially equal to but slightly less than the diameter of the workpiece. The guide surface curves toward the finger periphery in the direction of starwheel rotation to guide workpieces into the inner-finger recesses. The starwheel fingers are constructed of radially deformable material and cooperate with the aforementioned radial clearance or spacing to prevent jamming.

Various embodiments of the workpiece feed station include those which are disposed internally or externally of the closed conveyor path and at differing elevations. The feed station starwheel is driven either directly by the chain drive shaft or indirectly by an idler sprocket coupled to the moving chain. The workpiece guide surface is adjustable radially with respect to the starwheel periphery for accommodating workpieces of varying circular cross section. The conveyor pockets comprise a plurality of spools cantilevered from the drive chain and cooperating with each other and with guide rails extending along the conveyor path for capturing individual workpieces and they travel between the feed and discharge stations. The discharge station preferably comprises a second starwheel driven by the chain and having a plurality of radial fingers which successively enter the conveyor pockets so as to displace workpieces therefrom.

Another embodiment of the feed station in accordance with the invention comprises a gravity chute having a downwardly inclined workpiece support surface, and a length or reach of conveyor chain spaced above and inclined downwardly toward said surface. Natural flexure of the chain reach, coupled with inclined orientation thereof relative to the support surface and spacing between the elevator pockets, cooperate so that as the chain-carried elevator pockets progressively engage workpieces directed by gravity toward the lower end of the chute surface, the conveyor chain "gives" and the conveyor-mounted spools automatically accommodate themselves to the successive workpieces, thereby preventing jamming of the workpieces or damage to the conveyor mechanism.

BRIEF DESCRIPTION OF THE DRAWINGS

The invention, together with additional objects, features and advantages thereof, will be best understood from the appended claims and the following description read in conjunction with the accompanying drawings in which:

FIG. 1 is a fragmentary elevational view of a pocket elevator in accordance with one presently preferred embodiment of the invention;

FIG. 2 is a fragmentary elevational view of the elevator feed station in FIG. 1 on an enlarged scale;

FIGS. 3 and 4 are fragmentary elevational views of a portion of the feed station of FIG. 2 and illustrating operation of the invention;

FIG. 5 is a sectional view taken along the line 5—5 in FIG. 7;

FIG. 6 is a sectional view taken along the line 6—6 in FIG. 1;

FIG. 7 is a sectional view taken along the line 7—7 in FIG. 2;

FIG. 8 is a sectional view taken along the line 8—8 in FIG. 6;

FIG. 9 is an elevational view of the discharge station illustrated in FIG. 1 on an enlarged scale;

FIG. 10 is a sectional view taken substantially along the line 10—10 in FIG. 9;

FIG. 11 is an elevational view similar to FIG. 9 of a discharge station in accordance with a second embodiment of the present invention;

FIG. 13 is a sectional view taken substantially along the line 13—13 in FIG. 12;

FIG. 14 is an elevational view of a feed station in accordance with yet another embodiment of the invention.

DETAILED DESCRIPTION OF PREFERRED EMBODIMENTS

Figure 12:
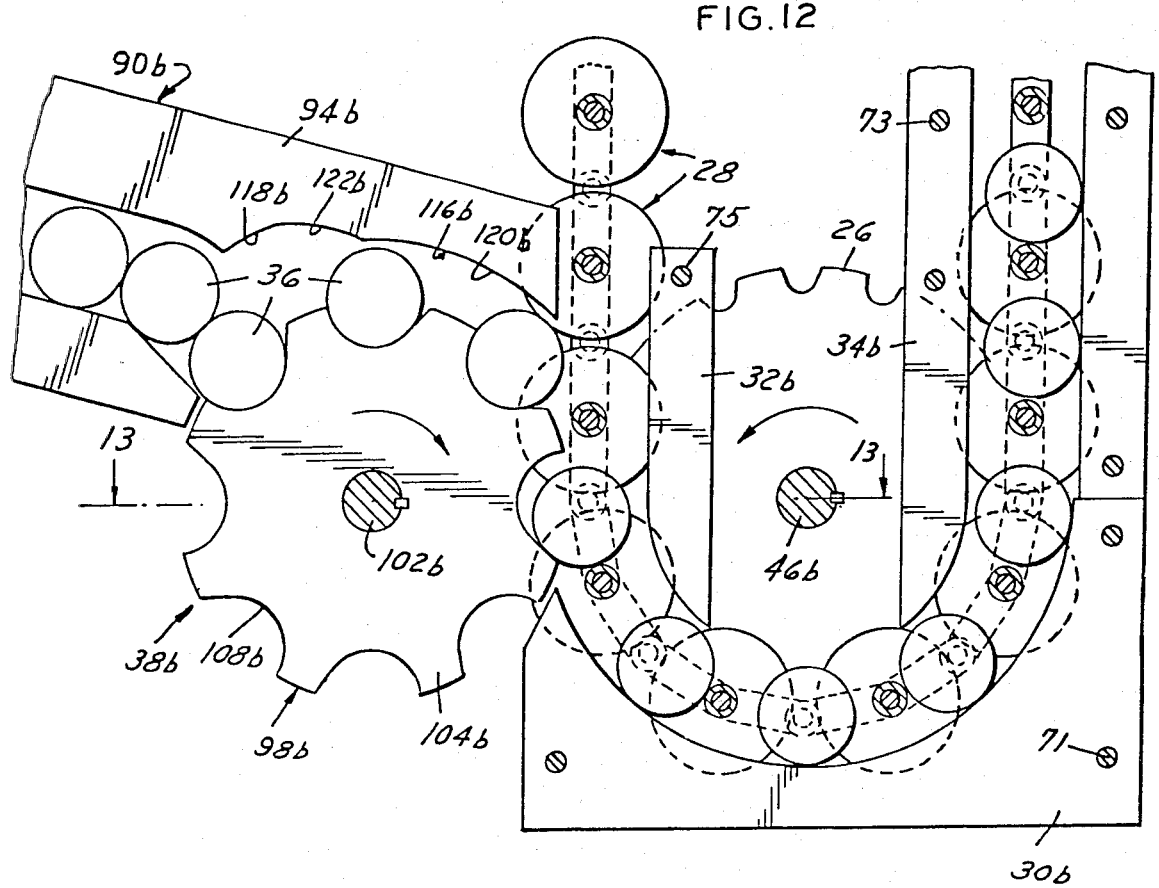
FIG. 12 is an elevational view similar to FIG. 2 of a workpiece feed station in accordance with a further embodiment of the present invention.

FIG. 1 illustrates a pocket conveyor 20 in accordance with the invention as comprising an endless chain 22 driven in a closed path or loop around upper and lower chain sprockets 24, 26. A plurality of spools 28 are mounted on chain 22 and are spaced from each other lengthwise of the chain so as to cooperate with the guide rails 30, 32, 34 to form a series of successive pockets for capturing and transporting successive workpieces 36 of circular cross section from a feed station generally indicated at 38 adjacent to the lower end of conveyor 20 to a discharge station 40 adjacent to the upper conveyor end. It will be appreciated that conveyor 20 illustrated in FIG. 1 is of a type often referred to as an "elevator," functioning to raise or elevate workpieces to that they may thereafter be transported by gravity chutes or the like. Although the invention to be described provides particular advantages in elevators, which is the presently preferred application of the invention, it will be recognized that many principles thereof are in no way limited to elevator applications. The particular workpieces of circular cross section in connection with which the invention was developed are pinion gears. However, workpieces 36 could as well comprise bearing races, shafts, cans or spherical objects such as ball bearings.

Referring now to FIGS. 1-10 in greater detail, chain 22 comprises a series of interconnected links 42 trained around upper and lower sprockets 24, 26. Lower sprocket 26 is rotatably coupled by a key 44 (FIGS. 5 and 7) to a drive shaft 46, and thence to external chain drive means. In the particular embodiment illustrated in FIG. 7, shaft 46 is rotatably mounted within the elevator support frame 48 by the bearings 50 and is coupled externally of frame 48 by a sprocket 52 and a chain 54 to a drive motor or the like (not shown) for rotation in the counterclockwise direction (FIG. 2). Chain 22 is guided from lower drive sprocket 26 to and from upper sprocket 24 (FIGS. 1 and 10) by respective coplanar opposed pairs of chain guide rails 70, 72 and 74, 76 (FIGS. 1, 5-7 and 9). Rails 70-76 are preferably constructed of a high molecular weight polymer having a low coefficient of friction and good wear characteristics, and are mounted within support frame 48 by the respective bolts 71, 73, 75, 77. Upper sprocket 24 is mounted by a sleeve bearing 79 to a shaft 80 (FIGS. 1, 9 and 10) which is fixed within the support frame.

Links 42 of chain 22 are interconnected by the open-ended bearing sleeves 56 (FIG. 8). A bolt 58 extends through alternate sleeves 56. Spools 28 each comprises a pair of centrally apertured discs 60, 62 received over a corresponding bolt 58 and separated from each other by a hollow cylindrical spacer 64. The central portions of discs 60, 62 are outwardly or oppositely dished, as best seen in FIG. 8, to receive the ends of spacer 64 and to space the disc peripheries from the adjacent chain link bearings 56. The disc peripheries are outwardly and oppositely flared. The length of spacer 64, the diameter of discs 60, 62 and the number of adjacent links between spool mounting bolts 58 are chosen such that a workpiece may be freely introduced from a lateral direction into the "pocket" fromed by adjacent spools, but will not fit between the peripheries of adjacent discs. A lock nut 66 is received on each bolt and tightly clamped disc 60, spacer 64 and disc 62 against the corresponding link bearing 56. Each spool 28 is thus cantilevered from chain 22 by the corresponding bolt 58.

An outer spool guide rail 34 (FIGS. 1-2, 6-7 and 9) is mounted within frame 48 by bolts 71 and has an inner guide surface 80 which extends downwardly from feed station 38 in an arcuate path and then upwardly to discharge station 40. A pair of inner spool guide rails 30, 32 are mounted to frame 48 by bolts 75, 73 and have the respective outwardly facing guide surfaces 82, 84 opposed to and uniformly spaced from guide surface 80 of guide rail 34. Spool guide 30 extends downwardly from feed station to just beneath the axis of drive shaft 46, as best seen in FIG. 1. Spool guide 32 extends upwardly from adjacent shaft 46 to discharge station 40. As best seen in FIGS. 1-2 and 6-7, the spacing between guide surfaces 80, 82 and 80, 84 is less than the diameter of spool discs 60, 62, with the guide surfaces thus being disposed within the flared peripheries of the spool discs to cooperate therewith for capturing workpieces 36 within the elevator pockets. Most preferably, the guide rails 30, 32, 34 are constructed of high molecular weight polymeric material to reduce friction and scuffing of the captured workpieces.

Feed station 38 (FIGS. 1-5 and 7) includes a chute 90 having a lower guide ramp 92 and an upper guide bar 94 spaced from the opposing upper surface of lower ramp 92 so as to provide a downwardly inclined workpiece passage 96. A starwheel 98 is rotatably coupled by a key 100 to a shaft 102 which is mounted within frame 48 by the bearings 114 (FIG. 7) for rotation about a fixed axis perpendicular to the planar path of the elevator pockets. Starwheel 98 consists of a plurality of angularly spaced radial fingers 104 separated from each other by identical concave recesses 108. The plane of rotation of starwheel 98 is such that the starwheel fingers successively pass beneath the lower end of chute passage 96 and into the conveyor pockets between spool discs 60, 62 (FIG. 7). The axis of rotation of starwheel 98 is parallel to the axis of sprocket 96 and parallel to the cross sectional axis of workpieces 36 presented by chute 90.

An idler sprocket 110 (FIGS. 5 and 7) is rotatably coupled by a key 112 to shaft 102 and has peripheral teeth engaged with the links of chain 22 where the chain exits guides 74, 76 in the downward direction. Starwheel 98 thus rotates clockwise as viewed in FIGS. 1-4 from chute passage 96 to pocket spools 28. The outer peripheral faces 105 of starwheel finger 104 are cylindrical on a common radius R (FIG. 3) with respect to the axis of shaft 102. Each face 105 has a uniform axial thickness (FIG. 7) and a circumferential dimension C (FIG. 3). Recesses 108 have a depth equal to or slightly less than $d/2$, where d is the diameter of workpieces 36. The radius of curvature of each recess 108 is uniform at $d/2$, up to adjacent the forward finger 104, where the radius of curvature begins increasing. This increasing radius of curvature aids parts in entering pockets 108 and decreases the peripheral dimension of fingers 104. Thus, the leading tangential face of each finger 104, which is arcuate at radius $d/2$, is more steeply inclined than the trailing finger face for enhanced capturing of workpieces. Starwheel 98 is preferably unitarily or integrally constructed of a resiliently deformable material, such as cast polyurethane. A durometer hardness number of 95A for starwheel 98 has been found to operate satisfactorily.

Upper chute guide bar 94 projects over starwheel 98 and has a contoured lower surface 116 spaced from the outer periphery of starwheel fingers 104 for urging workpieces 36 into starwheel recesses 108 and holding the workpieces therein for transport to the elevator pockets. More specifically, and referring in particular to FIG. 3, a first surface portion or segment 118 adjacent to chute passage 96 has a radius of curvature from the axis of shaft 102 equal to the radius R of the periphery of fingers 104 plus slightly less than the diameter d of workpieces 36, preferably about 95% of workpiece diameter d. Circumferentially, surface segment 118 extends in the direction of starwheel rotation over a distance C equal to the circumferential dimension of outer peripheral face 105 of one starwheel finger 104. A second portion 120 of surface 116 adjacent to chain 22 has a radius of curvature with respect to the axis of shaft 102 which is sufficiently greater than the sum of the radius from said axis to the root of recesses 108 plus the diameter d of workpieces 26 to permit the workpieces to travel freely therebeneath while preventing escape of the workpieces from recesses 108. The intermediate surface portion 122 is concave and blends surfaces 118, 120 smoothly into each other. Most preferably, the circumferential dimension of surface portion 122 is equal to workpiece diameter d, although the same guide surface 116 may be used in combination with a plurality of workpiece diameters, as will be described. The broken line extension 121 of surface 120 is a representation of the surface contour portion of a starwheel inlet chute according to the prior art.

In normal operation of feed station 38 (FIGS. 3 and 4), workpieces 36 are fed by gravity along inclined chute passage 96 to starwheel 98. The starwheel is rotated continuously in synchronism with elevator pocket travel by means of sprocket 110 meshed with elevator chain 22 as previously described. When an ample supply of workpieces 36 is available, the workpieces backup along chute passage 96 and advance by gravity into successive starwheel recesses 108 as the starwheel is rotated in the clockwise direction. The workpieces are then carried by starwheel 98 to and deposited by gravity in elevator pockets defined by successive spools 28. The end 123 of guide 30 (FIG. 2) adjacent to feed station 40 prevents the workpieces from being carried out of the elevator pockets by the starwheel.

It occasionally occurs in manufacturing processes that an insufficient supply of workpieces 36 is available to the elevator feed station, so that a number of elevator pockets may pass the starwheel without workpieces being inserted therein. It may then happen that workpieces, which usually are directed through feed chute 96 out of synchronism with starwheel rotation, may be made available to the starwheel at a time which would normally cause the workpiece to be jammed between a starwheel finger and the opposing guide surface. This potential jam situation is illustrated in phantom in FIG. 4. In accordance with an important feature of the present invention, the clearance space formed by guide surfaces 118, 122 (compared with 121 in FIG. 2) cooperates with the compliant or resiliently deformable construction of the starwheel fingers to avoid workpiece jam in this situation. More specifically, in the event of such random feed and a potential jam situation (FIG. 4), the starwheel finger abutting the workpiece is gradually radially deformed, and at the same time the workpiece is "rolled" counterclockwise along surface section 118. This rolling action continues until the deformed finger "rolls under" the abutting workpiece, at which point the workpiece drops onto the next-following recess and the finger returns to normal geometry.

It will be apparent that the radius of surface segment 118 necessary to obtain the rolling action previously described, and thus avoiding jamming, depends in large measure upon the construction of starwheel 98. As long as the starwheel fingers can absorb workpiece abutment by radial deformation, the invention will operate as previously described. However, if the abutting starwheel finger bends under the force of rotation against a workpiece into the following recess 108, the workpiece will not be able to fall into such recess. This places a limit upon the ratio of workpiece diameter d to the radius of surface segment 118 for a starwheel 98 of given resiliency. Starwheel fingers 104 are of uniform thickness measured in the axial direction (FIG. 7). Circumferentially (FIGS. 2–4), thickness of each starwheel finger increases from the free end toward the axis of rotation. This construction resists bending of the starwheel fingers, which is undesirable for reasons previously described.

To accommodate workpieces 36 of differing diameter over a relatively small range, upper chute guide bar 94 is mounted by the bolt 119 (FIG. 1) to frame 48 for adjustment with respect to the starwheel axis. The maximum allowable workpiece diameter is determined by the spacing of guide surfaces 80, 82, 84, the spacing of successive spool spacers 64 and/or the spacing of spool discs 60, 62. The minimum workpiece diameter is determined by the depth of recesses 108 and the proximity of the end 123 of guide 30 with respect to the starwheel periphery.

Discharge station 40 (FIGS. 1, 9 and 10) includes a wheel 130 affixed by pins or bolts to sprocket 24 to rotate in synchronism with elevator chain 22. Wheel 130, which is disposed in the plane of traveling elevator pockets 28 (FIG. 10), has a generally cylindrical periphery formed with a plurality of notches 134 circumferentially spaced to receive the spacers 64 of successive spools 28 as the wheel 130 is continuously rotated by the drive chain. The wheel portions between notches 134, which in effect comprise radiating fingers 136, thus enter successive pockets 28 as the spacers 64 advance upwardly beyond the upper ends of guides 32, 34 and displace workpieces 36 from within the elevator pockets. A downwardly inclined discharge chute 138 is mounted adjacent to the upper end of guide 34 so as to receive displaced workpieces 36 removed by wheel 130 from within successive elevator pockets and feed the now-elevated workpieces by gravity to a work station or collector, etc.

FIGS. 11–14 illustrate modifications to the basic embodiment of FIGS. 1–10. In FIGS. 11–14, elements identical to those previously discussed are indicated by correspondingly identical reference numerals, and modified elements are indicated by basic reference numerals followed by suffixs "a", "b", etc for the respective modifications. FIG. 11 illustrates a modified discharge station 40a wherein the discharge wheel 130a is disposed vertically between ends of the elevator chain loop rather than at the upper end of the elevator as in the embodiment of FIG. 9. In the modified embodiment of FIG. 11, wheel 130a is freely rotatably mounted by a bearing 79 to a shaft 80a fixedly mounted to the elevator frame. Again, wheel 130a has peripheral notches 134a which engage spools 28 as they pass, so that wheel 130a rotates in synchronism with chain 22, being driven thereby, and the intervening finger portions 136a displace workpieces 36 onto discharge chute 138a.

FIGS. 12 and 13 illustrate a modified feed station 38b wherein the parallel axes of rotation of drive sprocket 26 on drive shaft 46b and starwheel 98b on shaft 102b are disposed in the same horizontal plane, as distinguished from the vertically spaced and parallel relationship of these axes in FIGS. 1 and 2. Drive shaft 46b in the modified embodiment of FIGS. 12 and 13 extends axially between spool guides 30b, 32b and has a wheel 158 (FIG. 13) mounted for co-rotation thereon. A length of chain 160 extends around the periphery of wheel 158 and has both ends affixed thereto by the screw 162 and nut 164. Starwheel shaft 102b has a sprocket 110b mounted thereon by the key 111b and has peripheral teeth which abut the periphery of wheel 158 and engage chain 160. Thus, feed starwheel 98b is rotated in synchronism with chain drive sprocket 26 by means of wheel 158, chain 160 and sprocket 110b. FIG. 13 illustrates also another modification to the preferred embodiment of the invention wherein two sets of spools 28, 170 are cantilevered on respective opposite sides of elevator chain 22. Corresponding spool guides 172, etc. are mounted to the elevator frame as previously described. A second workpiece feed starwheel 174 is mounted on shaft 102b and rotatably coupled thereto by the key 176 so as to feed workpieces in synchronism between spools 170 in the manner hereinabove described.

FIG. 14 illustrates a further feed station embodiment 38c disposed internally rather than externally of the lower section of the elevator loop and driven by the elevator drive shaft 46. More specifically, a feed starwheel 98c is mounted on drive shaft 46 and rotatably coupled thereto by the key 100c. Drive shaft 46 is also rotatably coupled to sprocket 26 (FIG. 1) for driving chain 22. Outside spool guide 30c extends entirely around the lower end of the chain loop, while the inside spool guides 32c, 34c have opposing surfaces which operate as a vertical workpiece chute 90c. Chute 90c approaches the feed station at an angle and then drops with a twist (not shown) to locate workpieces 36 in the plane of starwheel 98c and spools 28. Thus, workpieces 36 are fed by chute 90c to starwheel 98c with circular cross sections on an axis parallel with the starwheel axis of rotation, and are directed by successive starwheel fingers to the elevator pockets defined by successive spools 28. The chute surface 116c has the same configuration and function as the surface 116 in FIG. 4.

Figure 15:
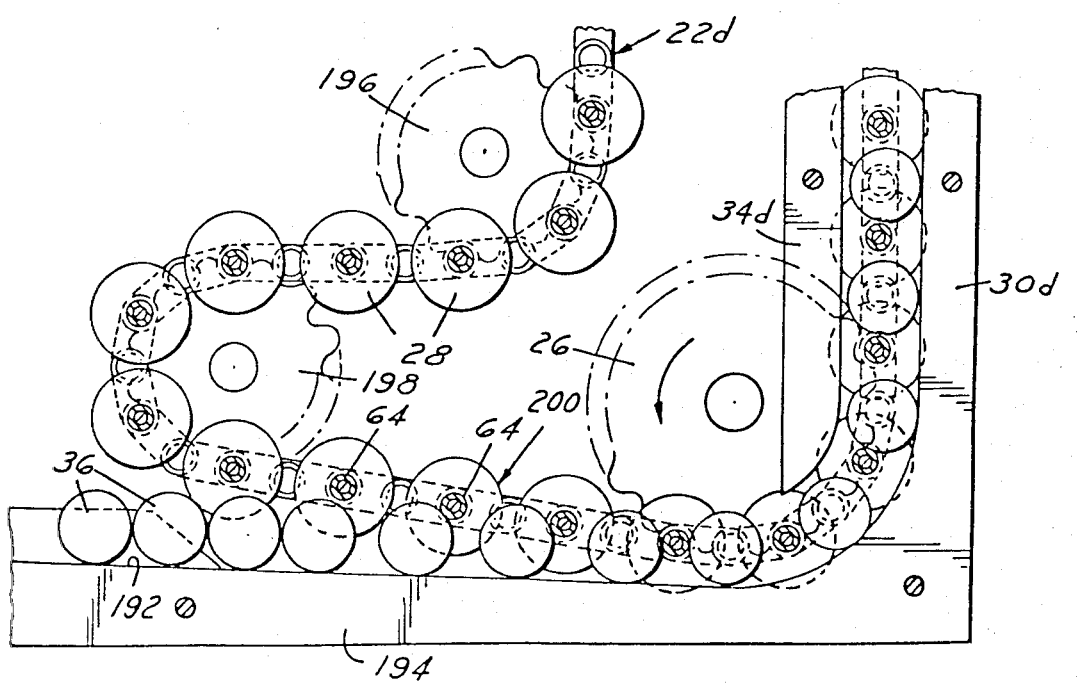
FIG. 15 is a further embodiment of the elevator feed station of the invention.

FIG. 15 illustrates a feed station 190 in accordance with another aspect of the invention wherein the workpieces 36 are fed by gravity directly to the elevator pockets rather than by an intervening starwheel or other positive feed mechanism. More specifically, the workpieces 36 are directed by gravity along the downwardly inclined surface 192 of a guide 194. Guide 194 extends around drive sprocket 26 and thus operates at least in part as an external spool guide 30d. Drive chain 22a, with spools 28 mounted thereto as previously described, is trained around a pair of idler sprockets 196, 198 so as to form a reach 200 of elevator spools 28 extending between idler sprocket 198 and drive sprocket 26 at a downward acute angle with respect to workpiece chute surface 192. The axes of rotation of sprockets 26, 198 are fixed by the elevator frame (not shown) to which the respective sprocket shafts are mounted. Natural flexure of chain reach 200 between sprockets 26, 198 permits the chain to flex in the vertical plane with respect to surface 192 and thereby conform to available workpieces 36 with one workpiece being disposed in each elevator pocket. More specifically, it will be seen that, as a pocket spool 28 first engages a workpiece 36 by abutment of the disc spacer 64 on the opposing workpiece surface, the elevator chain flexes upwardly away from the workpiece. This permits the spool spacer to roll or slide in the forward direction over the upper surface of the workpiece, which effectively pushes the workpiece back into the following elevator pocket. At the same time, the workpiece so being positioned pushes rearwardly on the remaining workpieces, so that workpiece is in a position with respect to the next spool for the same flexing and workpiece positioning action. In this way, the elevator automatically conforms to workpieces available on chute surface 192 without jamming.

Where workpieces of longer axial dimension are handled, it is considered preferable to suspend the pocket spools between parallel chains rather than to cantilever the spools from a single chain.

The features generic to FIGS. 1-15, as well as the specific embodiments of FIGS. 1-14, are the subject matter of concurrently filed application Ser. No. 457,969 assigned to the assignee hereof. This application is directed to the specific embodiment of FIG. 15.

The invention claimed is:

1. A pocket elevator for workpieces of circular cross section comprising
   an endless chain including means for driving said chain in a closed loop at uniform velocity in the direction of its length,
   a plurality of spools fixedly mounted on said chain and uniformly spaced from each other lengthwise of said chain with spool axes perpendicular to said loop to define therebetween a plurality of identical pockets for receiving and capturing said workpiece,
   each of said spools comprising a pair of discs separated by a spacer, each said pocket being defined by adjacent discs of successive spools and spacers of adjacent spools, separation between said spacers of adjacent spools being greater than the diameter of said workpieces circular cross section but less than twice said diameter,
   a feed chute including a guide having a fixed continuous downwardly inclined sloping linear guide surface disposed to receive workpieces adjacent its upper end in a line on said surface with the axis of said circular cross section perpendicularly to said line such that said workpieces tend to roll downwardly along said surface by force of gravity, and
   a pair of chain sprockets spaced apart lengthwise of said guide surface for directing said chain and pockets downwardly between said sprockets at an acute angle adjacent to and in the direction of slope of said surface such that said pockets successively engage said workpieces against said surface between said sprockets and capture successive ones of workpieces in successive corresponding ones of said pockets.

2. The elevator set forth in claim 1 wherein said sprockets are disposed such that line of travel of said spools between said sprockets is coplanar with said line of workpieces.

3. The elevator set forth in claim 2 further comprising spool guide means having opposed vertically oriented surfaces, one of which is contiguous with said guide surface of said chute means, for capturing said workpieces within said pocket.

4. A pocket elevator for workpieces of circular cross section comprising:
- an endless chain including means for driving the chain in a closed loop in the direction of its length,
- a plurality of spools mounted on said chain and uniformly spaced lengthwise of said chain with spool axes perpendicular to said loop to form a plurality of regularly spaced identical pockets, each for receiving and capturing a workpiece,
- each of said spools comprising a pair of discs separated by a spacer, each said pocket being defined by adjacent discs of successive spools and spacers of adjacent spools, separation between said spacers of adjacent spools being greater than the diameter of said workpiece circular cross section but less than twice said diameter,
- a feed chute including a guide having a fixed downwardly inclined linear guide surface, to the upper end of which a line of successive workpieces is adapted to be directed, with the axis of the workpieces extending perpendicular to said line so that the workpieces tend to roll downwardly along said surface, and
- a pair of chain sprockets spaced apart lengthwise of said surface and guiding said chain along a downwardly inclined path above said surface and converging with the line of said surface, said sprockets being disposed such that adjacent the upper end of said surface the pocket forming spools are spaced above and out of engagement with the underlying workpieces on said surface, and adjacent the lower end of said surface the pockets are sufficiently close to the surface to enclose the workpieces,
- whereby, as the chain progresses along said path, the pocket forming spools engage the upper surface portions of the successive workpieces in a downwardly progressing direction and eventually capture the workpieces in the successive pockets.

5. The elevator set forth in claim 4 wherein said sprockets are disposed such that the successive pocket forming members engage the successive workpieces on the forward sides thereof.

* * * * *